3,170,926
N-PHENYLPIPERAZINE COMPOUNDS
Anthony Stanley Fenton Ash, Epping, Andrew Malcolm Creighton, Mill Hill, London, and William Robert Wragg, Woodford Green, England, assignors to May & Baker Limited, Dagenham, England, a British company
No Drawing. Filed Aug. 18, 1961, Ser. No. 132,296
Claims priority, application Great Britain, Oct. 20, 1959, 35,550/59
12 Claims. (Cl. 260—268)

This application is a continuation-in-part of application Serial No. 62,556, filed October 14, 1960, and now abandoned.

This invention relates to heterocyclic compounds and has for an object the provision of new and useful compounds of therapeutic value and of intermediates for the preparation thereof. It further relates to the production of said compounds and such intermediates and to pharmaceutical compositions containing said compounds.

According to the present invention, there are provided new and useful N-phenylpiperazine compounds of the general formula:

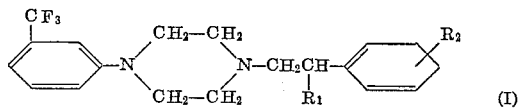

wherein $R_1$ represents a hydrogen atom or a hydroxy group, and $R_2$ is a group in the meta- or para-position selected from hydrogen atoms, and nitro, amino, allylamino, dimethylaminoethylamino, dimethylaminopropylamino, mono- and di-alkylamino, mono- and di-hydroxyalkylamino, monoacyloxyalkylamino, alkoxycarbonylamino, 2-ketooxazolidino, aliphatic acylamido (including sulphonamido, carbamoylamino and thiocarbamoylamino), and N-alkyl aliphatic acylamido groups, and acid addition salts of the said compounds. It is to be understood that the number of carbon atoms in each of the aforesaid N-substituents in $R_2$ shall not exceed 4 unless otherwise stated.

The aforesaid compounds possess pharmacological and psychotropic properties of utility in the treatment of psychiatric disorders. These properties are evidenced by the production of an increase in the psychomotor activity of rats and dogs. The preferred compounds are those represented by the general Formula I where $R_2$ represents a meta- or para-amino, mono- or di-alkylamino, monoor di-hydroxyalkylamino or aliphatic acylamido group as hereinbefore defined or a nitro group. Of particular interest are compounds represented by general Formula I where $R_2$ represents a meta- or para-amino, β-hydroxyethylamino, formamido, acetamido, carbamoylamino, methanesulphonamido, thiocarbamoylamino, γ-hydroxypropylamino or β-acetoxyethylamino group, for example, 1-(2-p-aminophenylethyl)-4-(m-trifluoromethylphenyl) piperazine,
1-(2-p-formamidophenylethyl)-4-(m-trifluoromethylphenyl)piperazine,
1-(2-p-β-hydroxyethylaminophenylethyl)-4-(m-trifluoromethylphenyl)piperazine,
1-(2-p-thiocarbamoylaminophenylethyl)-4-(m-trifluoromethylphenyl)piperazine,
1-(2-m-aminophenylethyl)-4-(m-trifluoromethylphenyl) piperazine,
1-(2-p-acetamidophenylethyl)-4-(m-trifluoromethylphenyl)piperazine,
1-(2-p-methanesulphonamidophenylethyl)-4-(m-trifluoromethylphenyl)piperazine,
1-2'-(p-aminophenyl)-2'-hydroxyethyl-4-(m-trifluoromethylphenyl)piperazine,
1-(2-p-γ-hydroxypropylaminophenylethyl)-4-(m-trifluoromethylphenyl)piperazine,
1-(2-p-carbamoylaminophenylethyl)-4-(m-trifluoromethylphenyl)piperazine, and
1-(2-p-β-actoxyethylaminophenylethyl)-4-(m-trifluoromethylphenyl)piperazine.

Among these compounds that most preferred is 1-(2-p-aminophenylethyl)-4-(m-trifluoromethylphenyl)piperazine which, together with its acid addition salts, has been shown to produce a useful increase in the psychomotor activity of depressive patients.

According to a feature of this invention, the compounds of general Formula I are prepared by the reaction of N-m-trifluoromethylphenylpiperazine of the formula:

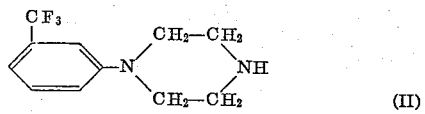

with a compound of the general formula:

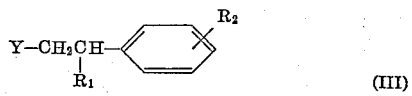

(wherein Y represents a reactive ester residue such as a halogen atom or a sulphuric or sulphonic ester residue and $R_1$ and $R_2$ are as hereinbefore defined). The reaction is preferably effected by heating the reactants in an inert solvent such as an alcohol (e.g. ethanol), a ketone (e.g. acetone), a benzene hydrocarbon or a halogenated hydrocarbon, in the presence of an acid-binding agent, e.g. an alkali metal or derivative thereof such as an alkali metal carbonate, alkoxide, amide or hydride, or a tertiary base such as triethylamine. The acid-binding agent is conveniently an excess of the N-m-trifluoromethylphenyl-piperazine of Formula II.

According to a further feature of the invention, the compounds of general Formula I are prepared by the reaction of m-trifluoromethylaniline of the formula:

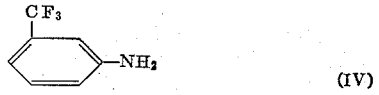

with a compound of the general formula:

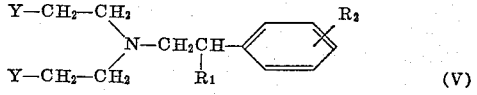

(wherein $R_1$, $R_2$ and Y are as hereinbefore defined). The reaction may be effected in the presence or absence of a solvent and in the presence or absence of an acid-binding agent, but is preferably effected in the presence of a solvent and an acid-binding agent as set forth in connection with the process given above.

According to a still further feature of the invention, the compounds of general Formula I are prepared by the reaction of a compound of the general formula:

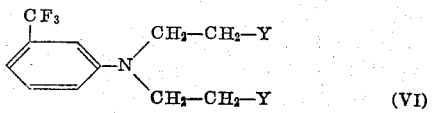

with a compound of the general formula:

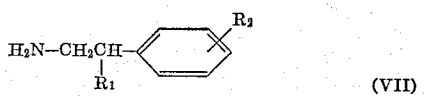

(wherein the symbols $R_1$, $R_2$ and Y have the meanings assigned to them above). The reaction may be effected in the presence or absence of a solvent and in the presence or absence of an acid-binding agent but is preferably effected as set forth in connection with the first process given above.

According to yet a further feature of the invention, the compounds of general Formula I are prepared by the reduction of a compound of the general formula:

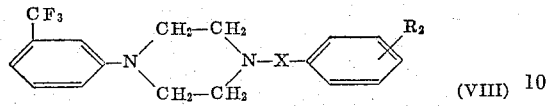

(wherein X is —CO—CH$_2$—, —CH$_2$—CO— or —CH=CH— and R$_1$ and R$_2$ have the meanings assigned to them above), using the general methods for the reduction of such groupings which are known per se from the literature.

According to another feature of the invention the compounds of general Formula I where R$_2$ is a p-nitro group may be prepared by the reaction of P-nitrostyrene of the formula:

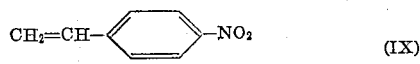

with a piperazine of Formula II.

According to another feature of the invention the compounds of Formula I where R$_2$ is a meta-nitro group are prepared by the reductive deamination of the diazo-compound derived from a corresponding meta-nitro-para-amino compound.

According to yet another feature of the invention, the compounds of general Formula I where R$_2$ is a m- or p-primary amino group may be prepared by the reduction of the corresponding compounds of general Formula I where R$_2$ is a m- or p-nitro group by known methods for the reduction of nitro groups, e.g. by catalytic hydrogenation.

As indicated above the symbol R$_2$ may represent a range of different amino-substituents. It is within the scope of the present invention to prepare a compound having a desired substituent by first preparing a compound which has a substituent different from that desired and thereafter converting this substituent to the desired substituent. Thus, the compounds in which R$_2$ is an acylamido substituent can be prepared from the corresponding primary amines by known methods of acylation, such as acetylation using acetic anhydride or formylation using formic acid. Such acylamido substituents can be converted into an amino substituent by hydrolysis according to known methods for hydrolysing amides, or into alkylamino substituents by reduction. Compounds in which R$_2$ is a monohydroxyalkylamino group can be prepared by reacting corresponding primary amino compounds with, for example, chloroethyl chloroformate followed by alkaline hydrolysis, or with an alkylene oxide such as ethylene oxide. Compounds in which R$_2$ is a di(hydroxyalkyl)amino group can be prepared from compounds in which R$_2$ is a primary amino group by reaction with an alkylene oxide. The expression "known methods" used herein means methods heretofore used or described in the chemical literature.

When the compounds of general Formula I are used for therapeutic purposes in the form of acid addition salts, it should be understood that only those such salts should in practice be employed as contain anions that are relatively innocuous to the animal organism when used in thereapeutic doses so that the beneficial physiological properties inherent in the parent compound are not vitiated by side-effects ascribable to those anions; in other words, only non-toxic salts are contemplated. Suitable acid addition salts include hydrohalides (for example, hydrochlorides), phosphates, nitrates, sulphates, maleates, fumarates, citrates, tartrates, methane sulphonates and ethane disulphonates. These salts may be made from the bases of general Formula I by the methods heretofore used in the art for making acid addition salts. For example, the acid addition salts may be made by mixing the required base with an equivalent quantity of a non-toxic acid in a solvent and isolating the resultant salt by filtration after, if necessary, evaporation of part or all of the solvent. They may be purified by crystallisation or by any other method commonly used in the art.

The following examples illustrate the invention:

Example I m-Trifluoromethylaniline (200 g.), diethanolamine (132 g.) and hydrobromic acid (285 ml., 48/50% w./w.) were heated together up to 180° C. during two hours, and the mixture then maintained at 180–200° C. for three hours. The solid product was allowed to cool and was then recrystallised, first from water and then from methanol to give N-m-trifluoromethylphenylpiperazine hydrobromide (215 g., 56%), M.P. 250–253° C.

N - trifluoromethylphenylpiperazine hydrobromide (207 g.), p-nitro-phenethyl bromide (156 g.), sodium carbonate (208 g.) and n-butanol (2.5 litres were boiled together under reflux for 24 hours. The reaction mixture was filtered hot and the inorganic residue extracted with warm chloroform. The combined filtrate and washings were evaporated to give an oil which was dissolved in methanol (550 ml. and treated with hydrochloric acid (120 ml., d.=1.18). The crude hydrochloride was filtered off and recrystallised from methanol to give 1-(2-p-nitrophenylethyl)-4-(m-trifluoromethylphenyl)piperazine monohydrochloride (198 g., 71%), M.P. 217–219° C. Treatment with aqueous ammonia gave the base as bright yellow prisms (after crystallisation from isopropanol), M.P. 74–75° C.

Example II

1 - phenethyl - 4 - (m - trifluoromethylphenyl)piperazine monohydrochloride, M.P. 205–207° C., was prepared in 51% yield from N-m-trifluoromethylphenylpiperazine and phenethyl bromide by essentially the same method as that described in Example I.

Example III

N - m - trifluoromethylphenylpiperazine hydrobromide (22.4 g.), 2-p-methanesulphonamidophenylethyl bromide (20 g.), dry triethylamine (18.2 g.) and dry benzene (400 ml.) were stirred together under reflux for 20 hours. The reaction mixture was cooled, washed with water (2 x 500 ml.), dried (with MgSO$_4$) and evaporated to give a pale brown oil. Recrystallisation from diisopropyl ether and then from isopropanol/diisopropyl ether gave colourless microplates of 1-(2-p-methanesulphonamidophenylethyl)-4-(m-trifluoromethylphenyl)piperazine (11.2 g., 36%), M.P. 108.5–109° C.

Similarly prepared by replacing the 2-p-methanesulphonamidophenylethyl bromide with 2-p-acetamidophenylethyl bromide was 1-(2-p-acetamidophenylethyl)-4-(m-trifluoromethylphenyl)piperazine (55% yield), M.P. 157–159° C.

2-p-methanesulphonamidophenylethyl bromide is prepared as follows:

2-p-aminophenylethyl bromide methanesulphonate was prepared by the catalytic hydrogenation of a solution of 2-p-nitrophenylethyl bromide (460 g.) in methanol (3,500 ml.) containing methanesulphonic acid (130 ml.) over platinum oxide (2%) at 420 p.s.i. Evaporation of the filtered solution gave a crystalline residue which was recrystallised from acetone/ether to give 2-p-aminophenylethyl bromide methanesulphonate (428 g., 73%), M.P. 161–162° C.

2-p-aminophenylethyl bromide methanesulphonate (59 g.), dry triethylamine (20 g.) and dry benzene (400 ml.) were stirred together at 5–10° C. for two hours. Dry triethylamine (22.5 g.) was then added in one portion, followed immediately by a solution of methanesulphonyl chloride (17.6 ml.) in dry benzene (50 ml.) which was added during twenty minutes at 5–8° C. The reaction mixture was stirred for an hour at room temperature, then heated under reflux for 45 minutes, cooled to 0° C. and filtered. The filtrate was washed with water (2 x 500 ml.), dried (with MgSO₄) and evaporated to give a pale brown crystalline residue. Recrystallisation from ethyl acetate/light petroleum (B.P. 60–80° C.) gave 2-p-methanesulphonamidophenylethyl bromide (34.5 g., 67%), M.P. 102–103° C.

Example IV

Ethylene oxide (6 x 10 ml.) was added at 30 minute intervals to a stirred solution of m-aminobenzotrifluoride (50 g.) in water (20 ml.) and glacial acetic acid (10 ml.) at −5 to 0° C. When the addition was complete, the mixture was stirred at room temperature for 19 hours and then slowly warmed to 80° C. and maintained at this temperature for 30 minutes. The reaction mixture was cooled and poured into an excess of dilute ammonia and the precipitated base was extracted with ether. Recrystallisation, first from isopropanol/cyclohexane and then from diisopropyl ether/cyclohexane, of the solid residue obtained by evaporation of the dried ether extracts gave m-NN-di-β-hydroxyethylaminobenzotrifluoride (57.9 g., 75%), M.P. 88–90° C.

A solution of m-NN-di-β-hydroxyethylaminobenzotrifluoride (57.5 g.) in warm benzene (200 ml.) was added slowly to phosphorus oxychloride (78.2 g.) and the mixture then heated under reflux for two hours. The reaction mixture was treated first with crushed ice and then with aqueous sodium carbonate (to pH 9) and the benzene layer separated and dried over MgSO₄. Evaporation of the benzene solution to constant weight gave slightly crude m-NN-di-β-chloroethylaminobenzotrifluoride (56.9 g., 85%) as a yellow oil.

p-NN-dimethylaminophenylethylamine dihydrobromide (9.8 g.), sodium carbonate (6.2 g.) and n-butanol (150 ml.) were heated together under reflux for 30 minutes. A solution of m-NN-di-β-chloroethylaminobenzotrifluoride (8.6 g., prepared as described above) in n-butanol (50 ml.) was added and refluxing continued for 16 hours. A further 6.2 g. of sodium carbonate was added and the mixture then heated under reflux for 90 minutes, cooled and filtered. The residue obtained on evaporation of the filtrates was dissolved in chloroform and the chloroform solution washed with water, dried (with MgSO₄) and evaporated to give a solid crystalline residue. Recrystallisation from isopropanol (30 ml.) gave pale buff plates of 1-(2-p-NN-dimethylaminophenylethyl)-4-(m-trifluoromethylphenyl)piperazine (5.9 g., 52%), M.P. 129–131° C.

Example V

1 - (2 - nitrophenylethyl) - 4 - (m - trifluoromethylphenyl)piperazine was prepared by boiling together for 24 hours under reflux a mixture of p-nitrostyrene (6.2 g.), m-trifluoromethylphenylpiperazine (9.5 g.) and n-butanol (100 ml.). The solution was then evaporated to give an oil which was dissolved in isopropanol (60 ml.) and treated with hydrochloric acid (3.6 ml., d.=1.18). The precipitated hydrochloride was collected and recrystallised from aqueous isopropanol to give 1-(2-p-nitrophenylethyl)-4-(m-trifluoromethylphenyl)piperazine monohydrochloride (6.5 g., 38%), M.P. 222–223° C. Treatment with aqueous ammonia gave the base as bright yellow prisms, M.P. 72–73° C. undepressed by admixture with the sample described above.

Example VI

A solution of 1-(2-p-nitrophenylethyl)-4-(m-trifluoromethylphenyl)piperazine (157 g.) in ethanol (1 litre) was hydrogenated over a 10% Raney nickel catalyst at 90 p.s.i. and 40° C. The catalyst was removed and the solution evaporated to dryness to give a solid residue, which, on recrystallisation from petroleum ether (1.2 litres, B.P. 80–100° C.), afforded 1-(2-p-aminophenylethyl)-4-(m-trifluoromethylphenyl)piperazine as pale cream plates (120 g., 85%), M.P. 83–85° C.

Example VII

1 - (2 - m - nitrophenylethyl) - 4 - (m - trifluoromethylphenyl)piperazine mono-hydrochloride (9.4 g.) was added to a vigorously stirred mixture of stannous chloride (40 g.), ethanol (100 ml.) and hydrochloric acid (200 ml., d.=1.18). The mixture was heated under reflux for one hour, then cooled to 0° C. and filtered. The almost colourless crystalline stannichloride was suspended in ice/water (ca. 250 g.) and treated with an excess of sodium hydroxide solution. The precipitated base was isolated as an oil by extraction with chloroform followed by evaporation of the dried chloroform extracts. Treatment of the oily base with hydrochloric acid in isopropanol followed by ether gave 1-(2-m-aminophenylethyl)-4 - (m - trifluoromethylphenyl)piperazine dihydrochloride (4.8 g., 48%), M.P. 209–211° C.

Example VIII

1 - (2 - p - aminophenylethyl) - 4 - (m - trifluoromethylphenyl)piperazine (10 g.), toluene (250 ml.) and formic acid (14 ml., 98%) were heated together under reflux for 22 hours by which time the evolution of aqueous formic acid, collected in a Dean and Stark trap, had ceased. The solid, obtained by evaporation of the reaction mixture, was crystallised from isopropanol to give 1 - (2 - p - formamido-phenylethyl) - 4 - (m - trifluoromethylphenyl)piperazine as a cream micro-crystalline solid (8.5 g., 79%), M.P. 123–125° C.

Example IX

1 - (2 - p - N - β - chloroethoxycarbonylaminophenylethyl)-4-(m-trifluoromethylphenyl)piperazine hydrochloride (22 g.) was added to a solution of potassium hydroxide (22 g.) in ethanol (125 ml.) and the mixture stirred under reflux for 2½ hours. The reaction mixture was then poured into an excess of ice/water and the solid product filtered off. Recrystallisation once from isopropanol and then twice from aqueous methanol afforded pale cream micro-prisms of 1-(2-p-N-β-hydroxyethylaminophenylethyl) - 4 - (m - trifluoromethylphenyl)piperazine (10 g., 58%), M.P. 63–65° C.

Similarly prepared was 1-(2-p-N-γ-hydroxypropylaminophenylethyl) - 4 - (m-trifluoromethylphenyl)piperazine, M.P. 112–114° C.

The starting material was prepared as follows:

A solution of 1-(2-p-aminophenylethyl)-4-(m-trifluoromethylphenyl)-piperazine (15.9 g.) in chloroform (50 ml.) was added during one hour at room temperature to a stirred solution of 2-chloroethyl chloroformate (7.25 g.) in chloroform (100 ml.). The reaction mixture was then heated under reflux for half an hour, cooled and treated with triethylamine (5.1 g.) and water (100 ml.). After stirring vigorously for a few minutes, the chloroform layer was separated, washed with water and dried over MgSO₄. The residue obtained by evaporation of this chloroform solution was crystallised from isopropanol to give pale cream microplates of 1-(2-p-N-chloroethoxycarbonylaminophenylethyl) - 4 - (m-trifluoromethylphenyl)piperazine (ca. 100%), M.P. 221–223° C.

Example X

A solution of sodium nitrite (2.5 g.) in water (25 ml.) was added dropwise during 15 minutes at 5°±2° C. to a vigorously stirred mixture of 1-2′-(4-amino-3-nitrophenyl)ethyl - 4 - (m-trifluoromethylphenyl)piperazine (13.5 g.) and hydrochloric acid (200 ml., 6 N). The bright red solution thus obtained was added during 15 minutes to a vigorously stirred solution of hypophosphorus acid (150 ml., 15%) at ca. 5° C. The mixture was stirred at ca. 5° C. for 30 minutes, then slowly heated to 90° C. during one hour, cooled to 0° C. and filtered. The solid product was dissolved in warm ethanol (ca. 100 ml.) and the resulting solution made just alkaline with 2 N sodium hydroxide and poured into an excess of water. Extraction of the precipitated oil with chloroform followed by evaporation the the dried chloroform extract gave crude 1-(2-m-nitrophenylethyl)-4-(m-trifluoromethylphenyl)piperazine as an orange oil. Treatment of a solution of this oil in isopropanol (150 ml.) with hydrochloric acid (5 ml., d.=1.18) followed by ether (200 ml.) gave a pale orange precipitate of the monohydrochloride (9.6 g., 68%), M.P. 210–211° C. (dec.).

The starting material was prepared as follows:

Anhydrous sodium acetate (56 g.) followed by acetic anhydride (750 ml.) was added to a solution of 2-p-aminophenylethyl bromide methanesulphonate (180 g. prepared as described in Example III) in glacial acetic acid (750 ml.) at ca. 35° C. The reaction mixture was stirred at ca. 25° C. for twenty minutes, then cooled to between 0° C. and 5° C. while fuming nitric acid (66 ml., d.=1.51) was added during a further twenty minutes. After allowing the mixture to be stirred at 5° C. for thirty minutes and at room temperature for an hour, it was poured into ice/water (ca. 8 kg.). The solid product was filtered off, washed with water (20 litres) and recrystallised from a mixture of isopropanol (1300 ml.) and ethyl methyl ketone (70 ml.) to give 2-(4-acetamido-3-nitrophenyl)ethyl bromide (145 g., 83%), M.P. 128–129° C.

2-(4-acetamido-3-nitrophenyl)ethyl bromide (20 g.), N-m-trifluoromethylphenylpiperazine (15 g.), dry triethylamine (9.6 ml.) and dry benzene (300 ml.) were heated together under reflux for seventeen hours. The cooled reaction mixture was filtered and the filtrate washed with water (2 x 150 ml.). Evaporation of the dried (with MgSO$_4$) benzene solution gave a solid residue which was recrystallised twice from isopropanol to give 1-2'-(4-acetamido-3-nitrophenyl)ethyl - 4 - m-trifluoromethylphenylpiperazine (25.0 g., 88%), M.P. 95–98° C. after crystallisation from isopropanol/light petroleum (B.P. 60–80° C.).

1-2'-(4-acetamido - 3 - nitrophenyl)ethyl-4-m-trifluoromethylphenylpiperazine (32.5 g.) was heated under reflux for thirty minutes with a solution of potassium hydroxide (10.5 g.) in aqueous ethanol (360 ml. 1:1). Dilution with water (250 ml.) and cooling to 0° C. allowed the precipitated oil to crystallise. The solid product was filtered off, washed with water, dried and recrystallised from isopropanol/light petroleum (B.P. 40–60° C.) to give 1-2'-(4-amino-3-nitrophenyl)ethyl - 4 - m-trifluoromethylphenylpiperazine (22.9 g., 78%), M.P. 89° C. after crystallisation from aqueous ethanol.

*Example XI*

N-m-trifluoromethylphenylpiperazine (from 46.7 g. hydrobromide), p-nitrostyrene bromohydrin (20 g.) and dry toluene (500 ml.) were heated together under reflux for 16 hours. The reaction mixture was cooled and filtered and the filtrate washed with water (500 ml.) and dried with MgSO$_4$. Evaporation of toluene solution gave an oil which crystallised from isopropanol/petroleum ether (B.P. 60–80° C.) and was recrystallised from isopropanol/cyclohexane to give DL-1,2'-(p-nitrophenyl)-2'-hydroxyethyl - 4 - (m-trifluoromethylphenyl)piperazine (11.6 g., 38%), M.P. 75–78° C.

*Example XII*

A solution of DL-1,2'-(p-nitrophenyl)-2'-hydroxyethyl - 4 - (m-trifluoromethylphenyl)piperazine (11.4 g.) (prepared as described in Example XI) in ethanol (200 ml.) was hydrogenated over 10% Raney nickel catalyst at 200 p.s.i./30° C. The solid residue obtained by evaporation was crystallised from isopropanol/light petroleum (B.P. 60–80° C.) to give DL-1,2'-(p-aminophenyl)-2'-hydroxyethyl-4 - (m-trifluoromethylphenyl)-piperazine as a pale cream micro-crystalline solid (8.4 g., 80%), M.P. 120–120.5° C.

*Example XIII*

Boron trifluoride etherate (23.2 g.) was added dropwise at room temperature to a solution of 1-2'-(p-β-hydroxyethylaminophenyl)ethyl - 4 - (m-trifluoromethylphenyl)piperazine (12 g.) in glacial acetic acid (120 cc.). The solution was then heated at 65–70° C. for 2 hours, cooled, and made alkaline with ammonium hydroxide. The basic product was extracted into chloroform and the solution evaporated leaving an oil to which hydrobromic acid (48% w./w., 8.7 cc.) was added. The solution was evaporated to dryness at <50° C. and the residue crystallised twice from isopropanol and ether to give 1-2'-(p-β-acetoxyethylaminophenyl)ethyl - 4 - (m-trifluoromethylphenyl)piperazine dihydrobromide, M.P. 176–180° C. (12.8 g., 71%).

*Example XIV*

A solution of sodium cyanate (3.8 g.) in water (50 cc.) was added over 10 minutes at 15–20° C. to a solution of 1-2'-(p-aminophenyl)ethyl-4-(m - trifluoromethylphenyl)-piperazine (19.6 g.) in hydrochloric acid (2 N, 56 cc.) and water (50 cc.). After stirring for 3½ hours at room temperature the solid product was collected and recrystallised from aqueous methanol to give 1-2'-(p-carbamoylaminophenyl)ethyl-4-(m - trifluoromethylphenyl)piperazine hydrochloride, M.P. 223–225° C. (11.0 g., 49%).

*Example XV*

A solution of 1-2'-(p-aminophenyl)ethyl-4-m-trifluoromethylphenylpiperazine (15.9 g.), in dry chloroform (50 cc.) was added dropwise over 1 hour at room temperature to a solution of methyl chloroformate (4.8 g.) in chloroform (100 cc.). The mixture was then refluxed for 30 minutes, cooled and made alkaline with an aqueous solution of triethylamine. After stirring, the chloroform layer was separated, and evaporated to dryness. The solid residue was crystallised from isopropanol to give 1-2'-(p-methoxycarbonylaminophenyl)ethyl-4-(m - trifluoromethylphenyl)piperazine, M.P. 134–136° C. (12.2 g., 67%).

*Example XVI*

A solution of potassium hydroxide (3.56 g.) in ethanol (50 cc.) and water (5 cc.) was added dropwise over 45 minutes to a refluxing solution of 1-2'-(p-β-chloroethoxycarbonylaminophenyl)ethyl- 4-m-trifluoromethylphenylpiperazine (15 g.) in ethanol (150 cc.). The mixture was refluxed for a further 2 hours, concentrated to 50 cc. and poured into ice water (200 cc.). The solid product was collected, washed with water, and recrystallised from aqueous isopropanol to give 1-2'-(p-2-ketooxazolidinophenyl)ethyl - 4 - m - (trifluoromethylphenyl)piperazine, M.P. 125–126° C. (76. g., 60%).

*Example XVII*

1-2'-(p-formamidophenyl)ethyl- 4 - m - trifluoromethylphenylpiperazine (10 g.) and sodamide (1.17 g.) were refluxed together in dry toluene (150 cc.) for 1 hour. Allyl bromide (3.5 g.) in dry benzene (100 cc.) was added to the resultant suspension at 95° C. over 2¼ hours and the mixture refluxed on the steam bath for a further 45 minutes. After filtering through "Hyflo Super-Cel" the solution was evaporated to an oil which was dissolved in ether and ethereal hydrogen chloride added. The crude 1-2'-(p-N-allyl-N-formylaminophenyl)ethyl-4-m-trifluoromethylphenylpiperazine hydrochloride (9.3 g., 81%, M.P. 152–155° C.) was collected and refluxed with excess concentrated hydrochloric acid for 4 hours. The solution was evaporated to dryness and the residue crystallised from ethanol and ether to give 1-2'-(p-N-allylaminophenyl)ethyl - 4 - m - trifluoromethylphenylpiperazine dihydrochloride hemihydrate, M.P. 179–181° C. (5.7 g., 47%).

Example XVIII

An intimate mixture of 1-2'-(p-aminophenyl)ethyl-4-(m-trifluoromethylphenyl)piperazine (15 g.) and ammonium thiocyanate (3.9 g.) was heated in an oil bath for one hour at 150° C. Amyl alcohol (120 ml.) was then added and the mixture stirred under reflux for four hours, cooled to 25° C., diluted with petroleum ether (150 ml., B.P. 60–80° C.) and filtered. Recrystallisation of the residue from n-butanol gave 1-(2-p-thiocarbamoylaminophenylethyl)-4-(m-trifluoromethylphenyl)piperazine as a pale yellow microcrystalline solid 7.0 g. (40%), M.P. 181–182° C.

Example XIX

A mixture of 1-2'-(p-acetamidophenyl)ethyl-4-(m-trifluoromethylphenyl)piperazine (10.6 g.), sodium hydride (1.4 g. of a 52% suspension in mineral oil, i.e. 1.1 equivalents) and dry toluene (200 ml.) were heated together under reflux in an atmosphere of nitrogen for 20 hours. A solution of 3-dimethylaminopropyl chloride (3.1 g.) in toluene (11 ml.) was added dropwise during half an hour and the mixture then heated under reflux for eight hours and evaporated to dryness. The residue was partitioned between chloroform and water and the chloroform layer separated and extracted with 2 N hydrochloric acid. The acidic aqueous solution was made just alkaline with aqueous sodium hydroxide and the oily product extracted with chloroform. Treatment of the dried ($MgSO_4$) chloroform solution with ethereal hydrogen chloride gave a precipitate of the rather hygroscopic 1-2'-(p-N-γ-dimethylaminopropylacetamidophenyl)ethyl-4-(m-trifluoromethylphenyl)piperazine dihydrochloride which was filtered off and washed with dry acetone. This product (10 g.) was heated under reflux with hydrochloric acid (100 ml., d.=1.18) for five hours. Basification of the cooled solution followed by chloroform extraction and evaporation of the chloroform extracts to dryness gave a solid residue (8.9 g.). Treatment of an ethanolic solution of this product with hydrochloric acid (4.5 ml., d.=1.18) followed by ether gave a precipitate of the trihydrochloride (8.0 g.). Recrystallisation twice from ethanol (96%) gave 1-2'-(p-N-γ-dimethylaminopropylaminophenyl)ethyl - 4 - (m - trifluoromethylphenyl)piperazine trihydrochloride as a pale cream microcrystalline solid, 4.9 g., M.P. 242–244° C.

The present invention further includes within its scope pharmaceutical compositions which comprise one or more compounds of general Formula I or their acid addition salts as aforesaid together with a significant amount of a pharmaceutical carrier. The invention includes especially such compositions made up for oral or parenteral administration. In clinical practice the compounds of the present invention will normally be administered orally so that compositions suitable for oral administration are preferred.

Solid compositions for oral administration include compressed tablets, pills, dispersible powders, and granules. In such solid compositions one or more of the compounds of general Formula I is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention for oral administration also include capsules of absorbable material such as gelatin, containing one or more of the active substances of general Formula I with or without the addition of diluents or excipients.

Preparations according to the invention for parenteral administration include sterile aqueous or non-aqueous solutions, suspensions or emulsions. Examples of non-aqueous suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 0.025% by weight of active substance in the case of injectable solutions and at least 0.1% by weight of such substance in the case of oral preparations.

The following example illustrates pharmaceutical compositions according to the invention:

Example XX

Tablets of the formula:

| | Mg. |
|---|---|
| 1-(2-p-aminophenyl-ethyl)-4-(m-trifluoro methylphenyl)piperazine dihydrochloride | 10 |
| Lactose | 49.5 |
| Starch | 20 |
| Dextrin | 20 |
| Magnesium stearate | 0.5 | are prepared by intimately mixing the piperazine derivative, lactose, starch and dextrin and passing the mixture through a 60-mesh British Standard sieve. After addition of the magnesium stearate, the mixture is granulated to a suitable size and the granules compressed to form tablets.

Instead of the piperazine derivative specified in the above formulation any other piperazine derivative within the terms of general Formula I may be employed, e.g. any of the other compounds of Formula I whose preparation is described above.

We claim:

1. The compound 1-(2-p-aminophenylethyl)-4-(m-trifluoromethylphenyl)piperazine.
2. The compound 1-(2-p-foramidophenylethyl)-4-(m-trifluoromethylphenyl)piperazine.
3. The compound 1-(2-p-β-hydroxyethylaminophenylethyl)-4-(m-trifluoromethylphenyl)piperazine.
4. The compound 1-(2-p-methanesulphonamidophenylethyl)-4-(m-trifluoromethylphenyl)piperazine.
5. The compound 1-(2-m-aminophenylethyl)-4-(m-trifluoromethylphenyl)piperazine.
6. The compound 4-(2-p-acetamidophenylethyl)-4-(m-trifluoromethylphenyl)piperazine.
7. The compound 1-2'-(p-aminophenyl)-2'-hydroxyethyl-4-(m-trifluoromethylphenyl)piperazine.
8. The compound 1-(2-p-γ-hydroxypropylaminophenylethyl)-4-(m-trifluoromethylphenyl)piperazine.
9. The compound 1-(2-p-carbamoylaminophenylethyl)-4-(m-trifluoromethylphenyl)piperazine.
10. The compound 1-(2-p-β-acetoxyethylaminophenylethyl)-4-(m-trifluoromethylphenyl)piperazine.
11. The compound 1-(2-p-thiocarbamoylaminophenylethyl)-4-(m-trifluoromethylphenyl)piperazine.

12. A member of the class consisting of the N-phenyl-piperazine compounds of the formula:

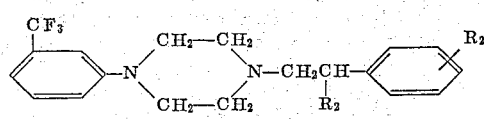

and their non-toxic acid addition salts, where $R_1$ is a member of the class consisting of hydrogen and hydroxyl, and $R_2$ is in one of the meta and para-poistions, and is a member selected from the class consisting of hydrogen, nitro, amino, allylamino, dimethylaminoethylamino, dimethylaminopropylamino, mono- and di-alkylamino, mono- and di-hydroxyalkylamino, monoalkanoyloxyalkylamino, alkoxycarbonylamino, 2-ketooxazolidino, alkanoylamido, alkylsulphonylamido, carbamoylamino, thiocarbamoylamino, and N-alkyl alkanoylamido, any N-substituents in $R_2$ containing a maximum of four carbon atoms.

References Cited by the Examiner
UNITED STATES PATENTS

| | | | |
|---|---|---|---|
| 2,647,121 | 7/53 | Jacoby | 260—268 |
| 2,834,782 | 5/58 | Schlesinger et al. | 260—268 |
| 2,927,924 | 3/60 | Mills | 260—268 |
| 2,939,816 | 6/60 | Trexler | 167—55 |
| 2,990,327 | 6/61 | Halpern | 167—55 |
| 2,997,474 | 8/61 | Janssen | 260—268 |
| 3,068,222 | 12/62 | Craig | 167—65 X |
| 3,070,606 | 12/62 | Anderson | 167—65 X |

OTHER REFERENCES

Yale: Journal Medicinal and Pharm. Chemistry, vol. 1, No. 2, pp. 121–133 (April 1959).

Yale: Trifluoromethyl Group in Medicinial Chemistry, American Chemical Society, Abstract of Papers, 134th meeting pp. 8–0 and 9–0, Entry 15 (1958).

NICHOLAS S. RIZZO, *Primary Examiner.*

WALTER A. MODANCE, *Examiner.*